United States Patent [19]

Andrews

[11] 4,117,182

[45] Sep. 26, 1978

[54] HEAT RELEASE LAYER FOR DECALCOMANIAS

[75] Inventor: Ray Andrews, Washington, Pa.

[73] Assignee: Commercial Decal, Inc., Mount Vernon, N.Y.

[21] Appl. No.: 753,926

[22] Filed: Dec. 23, 1976

[51] Int. Cl.$^2$ .................................................. B32B 3/00

[52] U.S. Cl. .................................. 428/201; 260/615 B; 427/148; 428/349; 428/355; 428/537; 428/411; 428/914; 428/500

[58] Field of Search ............... 428/352, 201, 355, 484, 428/500, 349, 914, 537, 411; 260/17 R, 22 CB, 27 B, 31.4 R, 31.6, 31.8 R, 33.2 R, 33.4 R, 862, 873, 874, 901, 615 B; 526/328, 329; 427/148; 156/89

[56] References Cited

U.S. PATENT DOCUMENTS

| | | | |
|---|---|---|---|
| 3,007,829 | 11/1961 | Akkeron | 427/148 |
| 3,052,566 | 9/1962 | Smith | 428/352 |
| 3,060,148 | 10/1962 | Exans | 260/45.5 |
| 3,404,021 | 10/1968 | Newman | 428/914 |
| 3,429,840 | 2/1969 | Lowe | 260/15 |
| 3,477,969 | 11/1969 | Parker | 260/17 |
| 3,533,822 | 10/1970 | Bailey | 428/914 |
| 3,869,416 | 3/1975 | Hoh | 260/27 R |
| 3,883,617 | 5/1975 | Krieg | 260/883 |
| 3,926,876 | 12/1975 | Fourier | 260/27 R |

*Primary Examiner*—Ellis Robinson

*Attorney, Agent, or Firm*—Lerner, David, Littenberg & Samuel

[57] ABSTRACT

A novel heat release layer for use in connection with decalcomanias which include a vitreous design layer surrounded by a heat release layer and a heat activatable adhesive layer is disclosed. In particular, the novel heat release layer disclosed comprises a normally solid straight chain, primary aliphatic oxyalkylated alcohol which preferably has a molecular weight above about 1350.In addition, methods of preparing such heat release decalcomanias are also disclosed, including applying a heat release layer to a backing sheet, applying a design layer to the heat release layer, and applying a heat activatable adhesive layer to the design layer, again wherein the heat release layer is as described above.

A novel combination of heat release layers and heat activatable adhesive layers is also disclosed, including the heat release layer described above in combination with a heat activatable adhesive layer including an acrylic resin and a tackifier for the acrylic resin including a polyethylene glycol and/or a solid polyoxyalkylene derivative of propylene glycol or ethylene diamine, and including an organic solvent therein, as well as the combination of the heat release layer with a heat activatable adhesive layer including a straight chain, primary aliphatic oxyalkylated alcohol, a cellulosic derivative, a plasticizer and an organic solvent.

31 Claims, 2 Drawing Figures

HEAT RELEASE LAYER FOR DECALCOMANIAS

FIELD OF THE INVENTION

The present invention is directed to heat release decalcomanias. Still more particularly, the present invention relates to decalcomanias which include a heat release layer disposed on a paper backing sheet, including a barrier coat, a design layer, and a heat-activatable adhesive layer disposed on the design layer, so that upon heating, the heat release layer permits release of the design layer from the backing sheet while simultaneously the adhesive layer is activated and permits retention of the design layer upon the ware. Still more particularly, the present invention relates to methods for forming such decalcomanias, including applying a heat release layer to a backing sheet, applying a design layer to the heat release layer, and applying a heat activatable adhesive layer to the design layer. In addition, the present invention is also directed to the decoration of various substrates by applying such decalcomanias thereto in the presence of heat and pressure.

BACKGROUND OF THE INVENTION

For many years various types of decalcomanias (decals) have been utilized for the decoration of articles or wares of various types, including glassware, china ware, pottery, aluminum, porcelain enamel, etc. These decalcomanias originally included the water or "slide-off" type in which a paper backing had a design layer disposed thereon and the paper carried a thin layer of a water soluble gum with a vitreous design imprinted thereon. Subsequently, however, as this art developed, decalcomanias of the "heat-release" type were developed, including a backing sheet, a design or pigment layer generally formed from inorganic pigments or oxides, and an optional protective layer applied on the design layer. These types of decalcomanias preferably included a release layer disposed between the backing sheet and the design layer to facilitate release of the design from the backing sheet during heating. Examples of typical heat-releasable decalcomanias are disclosed in a number of U.S. patents, including U.S. Pat. Nos. 2,970,076 to Porth; 3,007,829 to Akkeron; 2,991,221 to Bower; 3,411,458 to Milliken; 3,445,309 to Milliken; and 3,642,551 to Laconich et al.

In order to utilize such heat release types of decalcomanias, the article or ware to be decorated is generally preheated and the decalcomania can then be applied to the article with the backing sheet up so that the layer of heat-activatable adhesive directly contacts that article. Thus the heat applied to the article effects both a preliminary bonding of the design layer, via the heat-activatable adhesive, to the article or ware, while the heat also effects the release of the backing sheet, preferably including a barrier layer, and a portion of the release layer, from the design layer. The article can then be fired at high temperatures in the usual manner so that the design layer is melted and permanently fused to the article, and the combustible organic ingredients including the remaining portion of the release layer, the resinous carrier for the design layer, and the heat-activatable adhesive layer are preferably consumed during such firing.

The heat-release layers generally employed in such decalcomanias include those disclosed in the above-noted Porth and Akkeron patents. In particular, these include normally solid mixtures of polyethylene glycol compounds, and preferably as disclosed in the Akkeron patent including at least one polyethylene glycol compound which has an average molecular weight of from about 15,000 to about 20,000. These compounds have generally been employed as alternatives to vegetable or mineral waxes having melting points within the range of from about 130° F. to about 220° F. These types of decalcomanias, as noted above, have been employed for decorating various wares or articles. In connection with same, such decalcomanias of both the "underglaze" and "overglaze" type have been utilized. In the former case, the decalcomania is applied to the ware after its formation, but prior to its being glazed, which is accomplished after application of the decal to the ware. The glazes employed generally comprise vitreous coatings which generally require very high temperatures to form the glass from their raw materials. This procedure thus results in a protective coating over the pigments in the decal, but the high temperatures required tend to destroy certain colors, leaving only a limited color patette. Thus "overglaze" decalcomanias have also been developed in which application to the ware is carried out after it has been glazed. These decalcomanias generally include silk screen and lithographic decals. The present invention is intended for application in connection with all of these various types of decal applications of the heat release type.

In addition, in a recent application of Hazel Meade bearing Ser. No. 742,417, filed on Nov. 11, 1976, now U.S. Pat. No. 4,068,033 a novel heat activatable adhesive composition for use in such decalcomanias is disclosed. This adhesive composition is intended for use in connection with such ware decoration in a manner such that heating of the ware itself can be eliminated. These compositions thus include a "delayed tack" feature whereby the adhesive composition after it has been heated to above its softening point retains its tackiness or adhesive character for a suffacient amount of time for it to be applied to the ware, without the ware itself having to be heated. That portion of the above-noted application to Hazel Meade is incorporated herein by reference hereto, and will be discussed in more detail below in connection with the novel heat release layer of this invention.

The search has therefore continued for a new heat release composition which can be easily applied to the backing sheet, which has a melt viscosity such that release of the design layer is easily facilitated, which does not result in the application of a tacky surface to the outer surface of the design layer after it has been applied to the ware, and which can be completely burned off during firing without any adverse effects to the decoration itself. In addition, the search has also continued for a combination of heat release and heat activatable adhesive layers in such decalcomanias which includes all of these properties with regard to the heat release layer as well as the above-noted properties regarding the heat activatable adhesive layer, including the ability to remain tacky or adhesive after heating for a suitable period of time so that application to a cold ware can be effected, i.e. without heating of the ware itself and all of its concomitant problems.

SUMMARY OF THE INVENTION

In accordance with the present invention, it has now been discovered that a heat release layer for use in connection with heat release decalcomanias can be prepared having all of these desirable properties. In particular, in connection with heat release decalcomanias including a backing sheet, a design layer, and a heat activatable adhesive layer disposed on the design layer, a heat release layer disposed between the backing sheet and the design layer is provided which includes a normally solid straight chain, primary aliphatic oxyalkylated alcohol.

In a preferred embodiment, the heat release layer has a molecular weight above about 1350, and also preferably has a melting point above about 110° F. In this manner, the release of the design layer from the backing sheet upon heat activation is considerably facilitated, while at the same time, by using the novel heat release layers of the present invention, after release from the backing sheet, the residue of the release layer which remains on the design layer does not interfere with subsequent firing of the decalcomania. This, for example, as compared to wax marking of the color which occurred with the use in the past of various wax compositions and polyethylene glycols.

In another embodiment of the present invention, this novel heat release layer is employed in combination with a heat activatable adhesive layer comprising either (A) an acrylic resin as the adhesive base material, or (B) a suitable cellulosic derivative, preferable in connection with a straight chain, primary aliphatic oxyalkylated alcohol as the adhesive base component, a plasticizer, or as referred to herein, a tackifier, for that adhesive base component, and a major amount of an organic solvent. The tackifier is selected so as to be capable of providing an adhesive which softens when subjected to heat and remains tacky at a temperature substantially below its melting point. In particular, the tackifiers preferably employed in this combination, which can be cleanly burned upon final firing without deposition of a harmful residue, include (A) when an acrylic resin is employed as the adhesive base component; a polyethylene glycol, and/or a solid polyoxyalkylene derivative of propylene glycol or ethylene diamine, and in a highly preferred embodiment, a combination of tackifiers is utilized, including these tackifiers in combination with a second tackifier including one or more aromatic acid esters of monomeric or polymeric alkyl polyols. On the other hand, (B) when a suitable cellulosic derivative is employed as the adhesive, the tackifiers include various plasticizers including solid plasticizers such as dicyclohexyl phthalates and/or liquid plasticizers such as dioctyl phthalate, as well as the normally solid straight chain, primary aliphatic oxyalkylated alcohol.

In another embodiment of the present invention, heat release decalcomanias are formed by a method including the application of a heat release layer to a backing sheet, the application of a design layer to the heat release layer, and the application of a heat activatable adhesive layer to the design layer in which the heat release layer includes the normally solid straight chain, primary aliphatic oxyalkylated alcohols described above. In another highly preferred embodiment of the present invention, the heat activatable adhesive layer applied to the design layer which is used in connection with this heat release layer comprises the particular heat activatable adhesive layer described above, including preferably a combination of tackifiers as described therein.

DETAILED DESCRIPTION OF THE INVENTION

Figure 1:
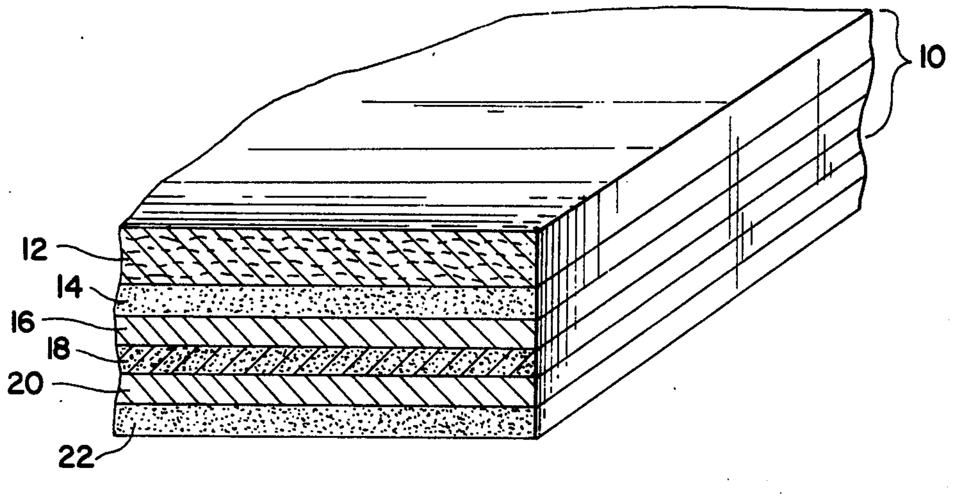
FIG. 1 is a diagrammatic cross-sectional representation of a heat releasable decalcomania in accordance with the present invention.

FIG. 1 illustrates a heat release decalcomania in accordance with the present invention which includes a decalcomania backing 10 consisting of a paper sheet 12, with barrier layer 14, and covered by release layer 16. A sealant layer 18 of a cellulosic derivative is preferably disposed over the release layer 16, and design layer 20 is disposed over cellulosic derivative or sealant layer 18, which serves as an imprint receiving support for the design layer. Over the design layer 20 is disposed the layer 22 of heat activatable adhesive material which serves as a temporary binder for securing the design layer 20 to the article or ware to be decorated.

The heat release layer 16 in accordance with the present invention comprises a normally solid straight chain, primary aliphatic oxyalkylated alcohol. Preferably, this component will include an oxyethylated alcohol of this type, and will have a melting point above about 110° F. Also, it will preferably have a molecular weight above about 1350, most preferably between about 1350 and 1750.

The preferred compounds so employed thus include such normally solid, straight chain, primary aliphatic oxyethylated alcohols marketed by BASF Wyandotte under the Trademark PLURAFAC. These compounds are generally manufactured by the addition of about 75 to 95% of Ethylene oxide to a straight chain, primary fatty alcohol. Most of these products are, however, either liquids or pastes at room temperature, and are not usable in accordance with the present invention. Some are, however, normally solid, and these include PLURAFAC A-38 and most particularly PLURAFAC A-39, and are particularly preferred herein.

One of the heat activatable adhesive layers 22 which may be used in combination with the heat release layer of the present invention is, as discussed above, fully disclosed in U.S. Ser. No. 742,417, in the name of Hazel Meade, which was filed on Nov. 17, 1976. The disclosure of that application is incorporated herein by reference thereto. In particular, the description of the heat activatable adhesive layer in that application is also incorporated herein, and comprises an (a) acrylic resin which serves as the adhesive base component, (b) one or more tackifiers including a polyethylene glycol and/or solid polyoxyalkylene derivatives of propylene glycol and/or ethylene diamine, and (c) a major amount of an organic solvent. Preferably, however, component (b) will also include a second tackifier including one or more aromatic acid esters of monomeric and polymeric alkyl polyols.

Furthermore, these adhesive layers may also include a cellulosic derivative which moderates the tackiness of the mixture of the acrylic resin and tackifiers and enhances the cohesiveness of such mixtures. The adhesive layer 22 also preferably includes an alkyd resin and a polystyrene plasticizer, as described in the above-noted Hazel Meade application. Furthermore, other solid plasticizers may also be added thereto as additional tackifiers, and the adhesive may also optionally include other components which will have a softening effect on the cellulosic derivative and/or the acrylic resin or will improve the firing characteristics of the decal.

As indicated, these adhesive base components of this particular adhesive composition which may be used in the decalcomanias of the invention preferably comprises one or more acrylic resins including acrylic and methacrylic polymers and copolymers such as polybutylacrylate, methyl methacrylate/butyl methacrylate copolymer, polyethyl acrylate, polymethyl acrylate, etc. Particularly suitable are acrylic resins of the Carboset series (trademark of B. F. Goodrich) such as Carboset 514A which is a 70% solution of low molecular weight acrylic copolymer in isopropyl alcohol, and Acryloid resins, such as ethyl methacrylate copolymer B-72 and methyl methacrylate copolymer B48N, produced by Rohm and Haas Co., Inc.

The polyethylene glycols employed as one of the tackifiers in the adhesive composition of the invention provide the desired and required tackifying effect so that these adhesives will be suitable for use herein. These components are crystalline solids which when melted have a relatively long open liquid phase, become tacky and remain tacky for a relatively long period after they cool down to below their melting point and eventually solidify. It has been found that conventional liquid plasticizers by themselves, such as diethylhexyl phthalate, dibutyl phthalate and the like do not provide the necessary prolonged tackiness to the adhesive composition so that when such adhesive is heated, it will adhere to the unheated article being decorated. Examples of such polyethylene glycols suitable for use as a tackifier component herein are solids of molecular weights ranging from 700 to 25,000 and preferably from about 3,000 to about 8,000 such as the Carbowax polyethylene glycols including mixtures of one or more such glycols. Such glycols add tack to the adhesive composition while giving a waxy quality thereto so as to inhibit blocking when the decalcomanias including the same are stacked for storage purposes.

The solid polyoxyalkylene derivatives of propylene glycol and/or ethylenediamine suitable for use as a tackifier component herein are solids generally having an average molecular weight of greater than about 5,000, preferably greater than about 8,000. These materials are preferably block polymers. Particular examples of such polyoxyalkylene derivatives of propylene glycol include the non-ionic series of related difunctional block polymers terminating in primary hydroxyl groups sold by BASF Wyandotte under the trademark Pluronic. Again, the solid members of this series of block polymers are useful in the present invention. An example of the polyoxyalkylene derivatives of ethylenediamine are the non-ionic tetrafunctional series of polyether block polymers sold by BASF Wyandotte under the trademark Tetronic. Once again, the solid members of this series of block polymers are useful in accordance with the present invention. Specific examples of the Pluronic polyols preferred in accordance with the present invention include Pluronic F108, in a flake form having an average molecular weight of about 14,000, Pluronic F98, Pluronic F127, and Pluronic 25R8. Examples of the Tetronic compositions which are most highly preferred in accordance with the present invention include Tetronic 1508, which is in the solid form having an average molecular weight of about 27,000, Tetronic 1307, etc.

The aromatic acid esters of monomeric and polymeric alkyl polyols can also be employed as one of the second tackifier components when a combination of such tackifiers is used in this adhesive composition of the invention, again to provide the desired and required tackifying effect so that these adhesives will be suitable for use herein. Examples of such aromatic ester tackifiers suitable for use herein include, but are not limited to, benzoic acid esters of alkylene or polyalkylene glycols such as neopentyl glycol dibenzoate (Benzoflex S-312), triethylene glycol dibenzoate (Benzoflex S-358), glyceryl tribenzoate (Benzoflex S-404), trimethylolethane tribenzoate (Benzoflex S-432), and pentaerythritol tetrabenzoate (Benzoflex S-552), (Benzoflex being a registered trademark of Velsicol Chemical Corp., Chicago, Illinois), as well as other polyol benzoates having melting points ranging from 47° to 99° C., and which have an unusual tendency to supercool and to recrystallize slowly.

The solid plasticizers which may be used as a tackifier in these adhesive compositions will thus include the aryl phthalates, such as diphenyl phthalate and dicyclohexyl phthalate.

The cellulosic derivatives can be used to moderate the acrylic resin, and to make it less tacky or less sticky. In addition, it will improve the firing or "burn-off" quality of the adhesive composition when it is fired. Examples of suitable cellulosic derivatives include cellulose acetate butyrate, ethyl cellulose, methyl cellulose, hydroxypropyl cellulose, ethyl hydroxyethyl cellulose, and the like. Preferred are cellulose acetate butyrates having a melting point ranging from about 265° to about 465° F.

The alkyd resins can be employed as modifiers for the adhesive composition, causing it to be easily softened upon application of heat thereto. Furthermore, it inhibits formation of pinholes in the decalcomania during firing and lift-off of the decal from the ware. The alkyd resins suitable for use herein preferably comprise long oil alkyds such as a long oil soya type alkyd, for example BURNOK 4040-LOMS-60 or BURNOK 4040-OMS-60, products of Washburn-Lanson Company of Chicago, Illinois. In addition, the adhesive composition may also preferably include a polystyrene plasticizer in admixture with the tackifier. Examples of such polystyrene plasticizers suitable for use herein are polymerized alpha-methyl styrenes, such as DOW resins 276-V2 and 276-V9.

Finally, these components of the adhesive compositions are employed in conjunction with one or more organic solvents which will substantially dissolve all solids to provide a flowable, but viscous, lacquer-like consistency to the composition. Thus, these adhesive components are not employed in aqueous solutions or dispersions, as are the prior delayed tack adhesives discussed above. Such solvents may thus include any of the known organic solvents for these components. Examples of such solvents include aromatic solvents such as any of the Solvesso (trademark of Exxon Corp.) line of solvents such as Solvesso 150 and 100, alcohols such as butyl alcohol, and diacetone alcohol, chlorinated hydrocarbons such as trichlorobenzene, ketones such as cyclohexanone, esters such as ethyl lactate, butyl lactate and isobutylacetate, methyl, butyl and ethyl Cellosolve (trademark of Union Carbide Corporation), monomethyl ether acetate of ethylene glycol, monomethyl ether of ethylene glycol and mixtures thereof, and the like.

As an alternative adhesive composition, however, may be utilized (a) a cellulosic derivative, (b) a straight chain, primary aliphatic oxyalkylated alcohol, in combination with (c) a tackifier and (d) a major amount of an organic solvent.

The cellulosic derivative used in this adhesive composition is fully described above, including such suitable cellulosic derivatives as cellulose acetate butyrate, ethyl cellulose (eg. ranging from Ethyl Cellulose N-7 up to Ethyl Cellulose N-300), methyl cellulose, hydroxy propyl cellulose, ethyl hydroxyethyl cellulose, and the like.

The normally solid straight chain, primary aliphatic oxyalkylated alcohol preferred for use in connection with these adhesive compositions may include the same normally solid straight chain primary aliphatic oxyalkylated alcohols discussed above in connection with the paper coating or release layer thereof.

The tackifiers useful in these adhesive compositions, include both normally solid plasticizers as well as combinations of liquid and solid plasticizers. The solid plasticizers preferred are those listed above, including the aryl phthalates, such as diphenyl phthalate and dicyclohexyl phthalate, and the liquid plasticizers include various conventional liquid plasticizers such as diethylhexyl phthalate, dibutyl phthalate, etc.

Also, the organic solvents utilized in connection with these adhesive compositions are the same organic solvents mentioned above with regard to the other adhesive compositions which may be employed in connection with this invention.

Furthermore, it is also possible to utilize the other compounds discussed above in combination with the adhesive coat mentioned herein, i.e. including the alkyd resins and the polystyrene plasticizérs. Also, it is preferred to employ an aromatic acid ester of a monomeric or polymeric alkyl polyol in combination with the tackifiers used in connection with the adhesive compositions employing such suitable cellulosic derivatives. These include the benzoic acid esters of alkylene or polyalkylene glycols discussed above, particularly the benzoflex compositions mentioned herein.

With regard to these adhesive compositions, i.e. employing the cellulosic derivatives as the adhesive base component, the cellulosic derivative will generally be present in an amount constituting from about 6 to 30 weight percent of the total adhesive composition, depending upon the viscosity of the particular cellulosic derivative employed, the normally solid, straight chain primary aliphatic oxyalkylated alcohol in an amount generally from about 3 to 15 weight percent of the total adhesive composition, the plasticizers, generally in an amount from about 6 to 30 weight percent of the total adhesive composition, preferably including from about 3 to 15 weight percent of the solid plasticizer and from about 3 to 15 weight percent of the liquid plasticizer, the aromatic acid ester of a monomeric or polymeric alkyl polyol in an amount generally from about 3 to 15 weight percent of the total adhesive composition, and the remainder of the adhesive will comprise the organic solvent, preferably from about 25 to 75 weight percent of the total adhesive composition, or more.

Those adhesive compositions of the invention which are based upon acrylic resins will generally contain the acrylic resin in an amount within the range of from about 10 to about 40% by weight, preferably from about 10 to about 35% by weight, and more preferably from about 12 to 26% by weight, and most preferably from about 16 to 26% by weight. The polyethylene glycols and/or polyoxyalkylene derivative tackifier component will generally be used in an amount within the range of from about 1 to about 25% by weight, and preferably from about 4 to about 25% by weight, and most preferably from about 6 to about 25% by weight. The aromatic ester tackifier component, when used, will generally be used in an amount within the range of from about 2 to about 25% by weight, preferably from about 3 to about 20% by weight, more preferably from about 3 to about 15% by weight, and most preferably from about 5 to about 7% by weight. The remainder of the adhesive will thus comprise the organic solvent, with or without the optional components as set out above.

With respect to the optional components which may be present in the adhesive composition of the invention, the solid plasticizers can be present in an amount within the range of up to about 20%, preferably from about 3 to 15% by weight, and most preferably from about 5 to 12% by weight. The cellulosic derivative may be present in an amount within the range of up to about 15% by weight, preferably up to about 8% by weight, more preferably from about 2 to about 8% by weight, and most preferably from about 3 to 5% by weight; the alkyd resin may be present in an amount within the range of up to about 10% by weight, preferably up to 7% by weight, most preferably from about 1 to 5% by weight; the polystyrene plasticizers may be present in an amount within the range of up to about 25% by weight, preferably up to about 10% by weight, most preferably from about 2 to 6% by weight.

The following are preferred formulations of adhesive compositions in accordance with the invention:

| | A | B | C | D | E | F | G | H | I | J | K* |
|---|---|---|---|---|---|---|---|---|---|---|---|
| Acrylic Resin | | | | | | | | | | | |
| Carboset 514A | — | 16 | 11.5 | 18 | — | 19.5 | 12 | — | — | — | — |
| Acryloid B-72 | — | 11 | 4.5 | 6.5 | — | 7 | 12 | — | — | — | — |
| Acryloid B-48N | 19 | — | — | — | 16.6 | — | — | 22.5 | 22.5 | — | — |
| Polyol Benzoate | | | | | | | | | | | |
| Benzoflex S-404 | 5.4 | — | 4.5 | — | 4.7 | — | — | — | — | — | 5.6 |
| Benzoflex S-552 | — | 5.5 | — | 6.5 | — | 7 | — | — | — | — | — |
| Polyethylene glycol | | | | | | | | | | | |
| Carbowax (4,000 or 6,000) | — | 8 | — | 8 | — | 9 | 6 | — | 19 | — | — |
| Polyoxyalkylene derivatives | | | | | | | | | | | |
| Pluronic F-108 | 16 | — | 20.5 | — | 14.2 | — | — | 19 | — | — | — |
| Oxyalkylated alcohol | | | | | | | | | | | |
| Plurofac A-39 | — | — | — | — | — | — | — | — | — | 5 | 6.4 |
| Cellulosic derivative | | | | | | | | | | | |

-continued

| | | | | | | | | | | | |
|---|---|---|---|---|---|---|---|---|---|---|---|
| Cellulose Acetate Butyrate (½sec) | — | — | 4.5 | 1.5 | 4.1 | — | — | — | — | — | — |
| Ethyl Cellulose N-200 | — | — | — | — | — | — | — | — | — | 12 | 10 |
| Plasticizer | | | | | | | | | | | |
| Dicyclohexyl Phthalate | — | — | — | — | — | — | 12 | — | — | 7.5 | 6 |
| Dioctyl Phthalate | — | — | — | — | — | — | — | — | — | 10 | 8 |
| Polystyrene Plasticizer | | | | | | | | | | | |
| Polystyrene 279V9 | — | 4 | — | 3 | — | 5 | 6 | — | — | — | — |
| Alkyd Resin | | | | | | | | | | | |
| BURNOK 4040-LOMS-60 | — | 4 | 2 | 4 | — | 5 | — | — | — | — | — |
| Solvent | | | | | | | | | | | |
| (remainder up to 100% in each case) | | | | | | | | | | | |

A preferred solvent mixture is comprised of the following:

| | % by weight of solvent mixture |
|---|---|
| Ethylene Glycol monomethyl ether acetate | 33 |
| Ethylene Glycol momomethyl ether | 33 |
| Diacetone alcohol | 14 |
| n-Butyl Alcohol | 20 |
| | 100% |
| | 100 |

*In this example, the solvent employed included 32% Solvesso and 32% Cellosolve.

The adhesive composition may be applied over the design layer 20 by silk screening techniques, by the use of a doctor blade, and by other conventional techniques as will be apparent to one skilled in the art.

In attempting to provide a heat releasable vitreous decalcomania by utilizing a wax coated paper as the temporary backing, difficulty may be encountered with proper release of the design layer from the backing upon application of heat. It has been found that such difficulty is accounted for at least in part by the fact that the molten wax under certain conditions tends to be absorbed into the porous paper sheet before the sheet and the vitreous design can be separated. Consequently, the ceramic colors have an opportunity to make direct contact with the paper sheet and tend to stick or adhere tenaciously to the same if there is no intervening film of wax or similar release material.

The temporary backing sheet 12 may comprise a suitable sheet material which is relatively non-porous and substantially impervious to the release layer of wax or equivalent material when the latter is in softened or molten condition. For example, the temporary backing may comprise a plastic film such as cellulose acetate or a thin metal foil or a fabric. However, in most cases it will be found most economical to employ a paper backing sheet 12 with a barrier coating 14 of a character which will resist penetration by molten wax or the like.

Generally, the barrier layer 14 may be in the nature of a surface sizing or seal coating such as starch, casein, glue, alkali metal silicate, etc., either with or without a clay type filler. A highly satisfactory barrier layer comprises starch, as well as water glass or other alkali metal silicate having dispersed therein talc, clay or like filler. As will be well understood, presence of the barrier coating 14 on the paper 12 prevents excessive penetration and absorption of the release layer 16 when the latter becomes soft or molten under heat release conditions.

The design layer 20 may be applied to the backing as one or more layers of an ink comprising an oxide colorant and a printing medium or vehicle with or without a glass flux or binder. The ink should contain from about 30 to 70% or more by weight oxide colorant. The printing medium or vehicle may be formed, for example, from one or more of such materials as drying oils, varnishes or resins. Examples of suitable resins are various alkyds and acrylics. Various additives may be incorporated into the vehicles, for example, dryers, promoters and/or accelerators.

The coloring agents of the design layer comprise ceramic pigments, having an average particle size within the range of from about 0.5 to about 2 microns which are incorporated into the binder or vehicle. Preferably, the pigments are metallic oxides of fine particle size, such as of an average particle size of less than about 1 micron. The pigments which may be used and the manner of their use are known to those skilled in the art. The oxides of the following elements are mentioned merely by way of example of some suitable ceramic pigments and the colors obtainable therefrom.

| Oxide of | Color |
|---|---|
| Fe, Cr. Zn | Brown |
| Co, Al | Blue |
| Cr, Co, Al | Green |
| Pb, Sb, Zn | Yellow |
| Cd, Se, S | Red |

As known to those skilled in the art, the composition of the vehicle or binder of the design layer is varied depending upon the oxide or oxides used as coloring agent and whether or not glass is present in the design layer. Again, the ink formulation must be varied depending upon the oxides employed, and it will be known to those skilled in the art. Again, the remaining discussion of these ink formulations contained in the Hazel Meade application Ser. No. 742,417 now U.S. Pat. No. 4,068,033 is also incorporated herein by reference thereto.

Figure 2:
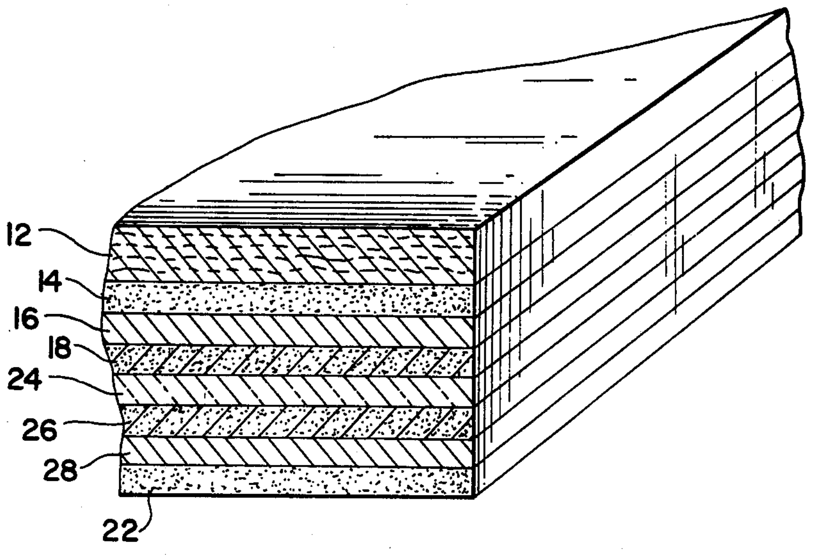
FIG. 2 is a diagrammatic cross-sectional representation of another embodiment of the heat releasable type decalcomanias in accordance with the invention.

FIG. 2 shows another embodiment of the heat-release decalcomania of the invention which includes a protective layer of glass flux over the design layer, in situ, in the decalcomania. Such heat-release decalcomania includes a decalcomania backing as shown in FIG. 1 including a backing sheet, such as a paper sheet 12, a barrier layer 14, and heat release layer 16. Over heat release layer 16 is a sealant layer 18. Disposed on sealant layer 18 is a protective layer 24 which preferably comprises a prefused glass flux layer. A second sealant layer 26 is disposed on the glass flux layer 24 and a design layer 28 is imprinted on the second sealant layer 26. Disposed over the design layer 28 is a heat-activatable adhesive layer 22 as employed in the decalcomania shown in FIG. 1.

The glass flux protective layer 24 is preferably a powdered prefused glass layer or coating which is colorless so that it does not interfere with or mask the colors of the design layer.

An amount of the glass flux should be deposited on the sealant layer 18 so that the protective glass coating thereafter formed will have a thickness within the range of from about 6 to about 28 microns and preferably from about 9 to about 20 microns. Thus, the ratio of thickness of the glass protective layer to the design layer should be within the range of from about 0.25:1 to about 5:1 and preferably from about 0.5:1 to about 3:1.

The coating or layer of powdered glass may be a low melting point glass or a high melting point glass having an average particle size within the range of from about 0.5 to 12 microns depending upon the manner in which the glass flayer is laid down. The essential requirement is that the glass should fuse at the firing temperature employed to bond the design to the ware. A low melting point glass may be composed essentially of powdered prefused lead boro-silicate glass which may also contain increments of one or more of the oxides of lithium, sodium, potassium, magnesium, calcium, aluminum, cadmium, zirconium, tin or titanium.

A prefused flux may, for example, be formed according to the following formulation:

| Ingredient | % by weight |
|---|---|
| lead oxide | 59 |
| silica | 24 |
| borax | 12 |
| zirconium oxide | 2 |
| titanium dioxide | 2 |
| sodium carbonate | 1 |

The protective glass layer may be applied over the sealant layer 18 by various methods, such as silk screening, offset printing, or by printing a clear film over the sealant layer 18 then dusting a prefused frit over the film. For example, by one method, a layer of varnish may be applied by a lithographic process to the areas it is desired to protect and the powdered glass then dusted on. This procedure could be repeated until desired thickness has been built up. If desired, the dusting operation may be eliminated by incorporating powdered glass into a film such as printing varnish, oil or resin.

Another method which may be used is to suspend the powdered glass in one of the various commonly known screening media or pastes. The contends of this paste may vary between 60 to 80 percent by weight of powdered glass and 40 to 20 percent by weight of the liquid vehicle. This paste may then be applied over the desired area by means of a silk or metal screening fabric acting as a stencil. By this method of the area of application is easily controlled. When using this method of application, sealant layer 18 may not be required.

After the protective glass flux layer is applied over the sealant layer 18, the second sealant layer 26 is applied over the protective layer 24. The second sealant layer 26 and the first sealant layer 18 may be of the same or different compositions. Inasmuch as it is more difficult to bond the sealant layer 18 to the wax layer 16 than it is to bond the sealant layer 26 to the protective glass layer 24, the sealant layer 26 may or may not include a bonding agent or other means for bonding the cellulosic derivative film-forming agent to the protective glass layer 24 where the glass layer is deposited by silk screen.

The second sealant layer 26 thus will generally comprise a cellulosic derivative film forming agent such as any of the cellulosic derivatives set out hereinbefore and preferably is cellulose acetate butyrate. In addition, if desired, such cellulosic derivative may include solvents, bonding agents, and/or plasticizers as described above in conjunction with the first sealant layer 18. A preferred second sealant layer 26 comprises the sealant layer composition set out hereinbefore with respect to FIG. 1.

The design layer 28 will generally comprise coloring agents, and a printing medium or vehicle and optionally glass particles as described hereinbefore with respect to the design layer 20 in FIG. 1. Design layer 28 can be imprinted on the second sealant layer 26 employing any conventional printing techniques such as described above in conjunction with FIG. 2.

It has been found that the design layer 28 cannot be imprinted directly on the protective layer 24 by lithographic techniques inasmuch as the color pigments of the design layer have been found to stain the protective layer and thus render the resulting decalcomania unacceptable. In accordance with the present invention, it has been found that in order to employ a protective glass layer over the design layer (deposited by lithographic techniques) in a heat-release decalcomania, it is necessary to separate the protective layer and the design layer from each other by employing a sealant layer 26 as described above.

In using the heat-release decalcomania shown in FIG. 2, adhesive layer 22 of the decalcomania is heated to its melting point and is applied to a ware to be decorated which causes heat-activatable adhesive layer 22 to bond the design layer 28 as well as the second sealant layer 26, the protective glass layer 24 and the first sealant layer 18, and perhaps a portion of the heat release layer 16, to the ware or article. At this time, the backing sheet 10 including the barrier layer 14, and a portion of the heat release layer 16 is released from the remainder of the decalcomania. Upon firing of the assemblage, the protective glass layer fuses and tightly binds the design layer to the ware and forms a contiguous, durable protective coating over the design on the surface of the ware. The organic combustibles of the heat-activatable adhesive layer, the two sealant layers and the remainder of the heat release layer are burned off during the firing.

The article is usually fired at a relatively low temperature and the powdered glass fuses so as to form an integral part of the article and provides a glass layer which protects the pigment of the design layer from chemical or mechanical action. A relatively low temperature can be used where the layer of glass powder is made up of prefused glass which will melt at much lower temperature than is required to fuse the raw materials from which the glaze on the ceramic ware itself is formed, in the case of an overglaze decalcomania.

The usual firing temperature required for this operation is between 1000° F. and 1600° F. It should be particularly noted at this point that this low temperature unlike the high temperatures used in applying the glaze to the entire article, does not operate to destroy or impair the color values of the pigments used. When using this decalcomania, as with all overglaze decals, the glaze is applied and fired on the ware before the decalcomania is transferred to the article, and thus the decalcomania is not subject to high temperatures. But in this case to protect the decalcomania and provide a permanent design preferably a low melting point glass is used over the pigments. The pigment is protected in much the same manner as the underglazed decals and yet the color values are not impaired by the application of very high temperatures such as are required in firing the glaze. Pigments of the type which are affected by contact with molten glass are affected in this case at the surface only and not sufficiently to impair color value of decalcomania.

Each of the embodiments of the decalcomania of the invention may be provided with a release layer disposed over the outer surface of the backing sheet 12 (that is the surface disposed away from the barrier layer 14). Such a release layer may be employed in lieu of a slip sheet and will facilitate stacking of a group of the decalcomanias and inhibit blocking or sticking of the decalcomanias to each other. The release layer may comprise any conventional types of release layers employed for this purpose.

The decalcomanias of the invention may be employed as decorations for ceramic ware, glassware, pottery, aluminum, porcelain enamel, or any other ware or surface which is normally decorated at 1600° F., or below, as well as for bisque or green ware, at higher temperatures.

It will be appreciated that the present description has been by way of example only and is not intended as a limitation to the scope of the invention.

What is claimed is:

1. A heat release decalcomania comprising a backing sheet, a heat release layer disposed on said backing sheet, a design layer disposed on said heat release layer and a heat activatable adhesive layer disposed on said design layer, said heat activatable adhesive layer capable of burning without the deposition of a residue, said heat release layer comprising a normally solid straight chain, primary aliphatic oxyalkylated alcohol.

2. The heat release decalcomania of claim 1 wherein said normally solid straight chain primary aliphatic oxyalkylated alcohol has a molecular weight above about 1350.

3. The heat release decalcomania of claim 2 wherein said alcohol has a melting point above about 110°.

4. The heat release decalcomania of claim 1 wherein said oxyalkylated alcohol comprises an oxyethylated alcohol.

5. The heat release decalcomania of claim 1 wherein said heat-activatable adhesive layer comprises an acrylic resin as an adhesive base component, a tackifier for said acrylic resin, said tackifier being selected from the group consisting of polyethylene glycols and solid polyoxyalkylene derivatives of propylene glycol and ethylene diamine, said tackifier being capable of providing an adhesive which softens when subjected to heat and remains tacky at a temperature substantially below its melting point, and an organic solvent therefor.

6. The heat release decalcomania of claim 1 wherein said heat-activatable adhesive layer comprises a cellulosic derivative as an adhesive base component, a straight chain, primary aliphatic oxyalkylated alcohol, a tackifier for said adhesive base component, and an organic solvent therefor.

7. The heat release decalcomania of claim 6 wherein said tackifier comprises a plasticizer selected from the group consisting of normally solid plasticizers, normally liquid plasticizers, and mixtures thereof.

8. The heat release decalcomania of claim 5 comprising a combination of tackifiers, including a second tackifier comprising an aromatic acid ester of a monomeric or polymeric alkyl polyol.

9. The heat release decalcomania of claim 6 comprising a combination of tackifiers, including a second tackifier comprising an aromatic acid ester of a monomeric or polymeric alkyl polyol.

10. The heat release decalcomania of claim 5 wherein said heat activatable adhesive composition includes up to about 15% by weight of a cellulosic derivative selected to moderate the tackiness of the mixture of acrylic resin and tackifiers and to enhance the cohesiveness of said mixture.

11. The heat release decalcomania of claim 8 wherein said aromatic acid ester of a monomeric or polymeric alkyl polyol comprises a benzoic acid ester of an alkylene or polyalkylene glycol.

12. The heat release decalcomania of claim 9 wherein said aromatic acid ester of a monomeric or polymeric alkyl polyol comprises a benzoic acid ester of an alkylene or polyalkylene glycol.

13. The heat release decalcomania of claim 11 wherein said benzoic acid ester of any alkylene or polyalkylene glycol is selected from the group consisting of neopentyl glycol benzoate, triethylene, glycol dibenzoate, glyceryl tribenzoate, pentaerythritol tetrabenzoate, trimethylolethane tribenzoate, and mixtures thereof.

14. The decalcomania of claim 5 wherein said polyoxyalkylene derivatives of propylene glycol and ethylene diamine are selected from the group consisting of solid difunctional block polymers terminating in primary hydroxyl groups having molecular weight greater than about 5000 and solid nonionic tetrafunctional polyether block polymers having molecular weight of at least about 5000.

15. A method of forming a heat release decalcomania which comprises applying a heat release layer to a backing sheet, applying a design layer to said heat release layer, and applying a heat activatable adhesive to said design layer, said heat release layer comprising a normally solid straight chain primary aliphatic oxyalkylated alcohol wherein said adhesive is capable of burning without the deposition of a residue.

16. The method of claim 15 wherein said normally solid straight chain primary aliphatic oxyalkylated alcohol has a molecular weight above about 1350.

17. The method of claim 15 wherein said heat activatable adhesive layer comprises an acrylic resin as an adhesive base component, a tackifier for said acrylic resin, said tackifier being selected from the group consisting of polyethylene glycols and solid polyoxyalkylene derivatives of propylene glycol and ethylene diamine, said tackifier being capable of providing an adhesive which softens when subjected to heat and remains tacky at a temperature substantially below its melting point, and an organic solvent therefor.

18. The method of claim 17 wherein said heat activatable adhesive layer includes a combination of tackifiers, including a second tackifier comprising an aromatic acid ester of a monomeric or polymeric alkyl polyol.

19. The method of claim 15 wherein said heat activatable adhesive layer comprises a cellulosic derivative as an adhesive base component, a straight chain primary aliphatic oxyalkylated alcohol, a tackifier for said adhesive base component, and an organic solvent therefor.

20. The method of claim 19 wherein said heat activatable adhesive layer includes a combination of tackifiers, including a second tackifier comprising an aromatic acid ester of a monomeric or polymeric alkyl polyol.

21. The heat release decalcomania of claim 5 wherein said acrylic resin is present in an amount of between about 10 and 40% by weight, and said tackifier is present in an amount of between about 1 and 25% by weight.

22. The heat release decalcomania of claim 5 wherein said polyethylene glycols have a molecular weight of between about 700 and 25,000.

23. A release paper for use in the preparation of a heat release decalcomania, said paper including a paper backing sheet coated with a heat release layer, wherein said heat release layer comprises a normally solid, straight chain, primary aliphatic oxyalkylated alcohol.

24. The release paper of claim 23 wherein said normally solid, straight chain primary aliphatic oxyalkylated alcohol has a molecular weight above about 1350.

25. The release paper of claim 24 wherein said alcohol has a melting point above about 110° F.

26. The release paper of claim 23 wherein said oxyalkylated alcohol comprises an oxyethylated alcohol.

27. A heat release decalcomania compising a backing sheet, a heat release layer disposed on said backing sheet, a design layer disposed on said heat release layer, and a heat activatable adhesive layer disposed on said design layer, said heat activatable adhesive layer capable of burning without the deposition of a residue, said heat activatable adhesive layer comprising a normal solid straight chain, primary aliphatic oxyalkylated alcohol, a tackifier, and an organic solvent therefore.

28. The heat release decalcomania of claim 27 wherein said heat activatable adhesive layer includes a cellulosic derivative as an adhesive base component.

29. The heat release decalcomania of claim 27 wherein said tackifier comprises a plasticizer selected from the group consisting of normally solid plasticizers and normally liquid plasticizers.

30. The heat release decalcomania of claim 27 wherein said heat activatable adhesive layer includes a second tackifier comprising an aromatic acid ester of a monomeric or polymeric alkyl polyol.

31. The heat release decalcomania of claim 30 wherein said aromatic acid ester of a monomeric or polymeric alkyl polyol comprises a benzoic acid ester of an alkylene or polyalkylene glycol.

* * * * *